· US011061727B1

(12) United States Patent
Gnyp et al.

(10) Patent No.: US 11,061,727 B1
(45) Date of Patent: Jul. 13, 2021

(54) PREVENTING PERFORMANCE DEGRADATION OVER TIME IN A CACHE

(71) Applicant: Amazon Technologies, Inc., Seattle, WA (US)

(72) Inventors: Monika Marta Gnyp, Maynooth (IE); Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 142 days.

(21) Appl. No.: 16/554,140

(22) Filed: Aug. 28, 2019

(51) Int. Cl.
*G06F 9/50* (2006.01)
*G06K 9/62* (2006.01)
*G06F 12/0802* (2016.01)

(52) U.S. Cl.
CPC ............ *G06F 9/5011* (2013.01); *G06F 9/505* (2013.01); *G06F 12/0802* (2013.01); *G06K 9/6218* (2013.01); *G06F 2209/503* (2013.01)

(58) Field of Classification Search
None
See application file for complete search history.

(56) References Cited

U.S. PATENT DOCUMENTS

2017/0185450 A1* 6/2017 Le Bars ............... H04N 19/426
2019/0250961 A1* 8/2019 Yamaoka ............ G06F 11/3006

* cited by examiner

*Primary Examiner* — Charlie Sun
(74) *Attorney, Agent, or Firm* — Davis Wright Tremaine LLP

(57) ABSTRACT

Systems and techniques are described for predicting future overlap in requests for a compute resource to address a system overload before it occurs. Requests for a resource may be tracked in time and grouped based on one or more common characteristics of the requests, such as a time of occurrence of the requests and a period that they repeat. Once grouped, different groups of requests for the resource may be tracked across at least one dimension, such as a periodic time of occurrence, a volume of requests, or a length of time of each occurrence of a group, to generate tracking data. Based on the tracking data, predictions may be generated indicating whether and to what extent the groups of resources will overlap at a future time. Additional resources may be provisioned to process the requests to prevent or reduce the likelihood of a system overload at the future time.

20 Claims, 9 Drawing Sheets

PREVENTING PERFORMANCE DEGRADATION OVER TIME IN A CACHE

BACKGROUND

Computing resources are more frequently and to a larger extent being offered from computing resource service providers to a larger user base, across various industries. This has created larger and often competing demands for computing resources, including bursts of traffic at various times. These resources may include various aspects of data storage and access, providing virtualized computing resources, and the like. As demand increases, the number of resources provided is similarly increasing to meet the demand. However, efficiently using those resources is becoming a more complex problem, particularly while trying to reduce cost for various users. While autoscaling services and resources provided to customers based on historical usage have addressed this issue to some extent, more improvements can still be made.

BRIEF DESCRIPTION OF THE DRAWINGS

Various techniques will be described with reference to the drawings, in which.

DETAILED DESCRIPTION

Figure 1:
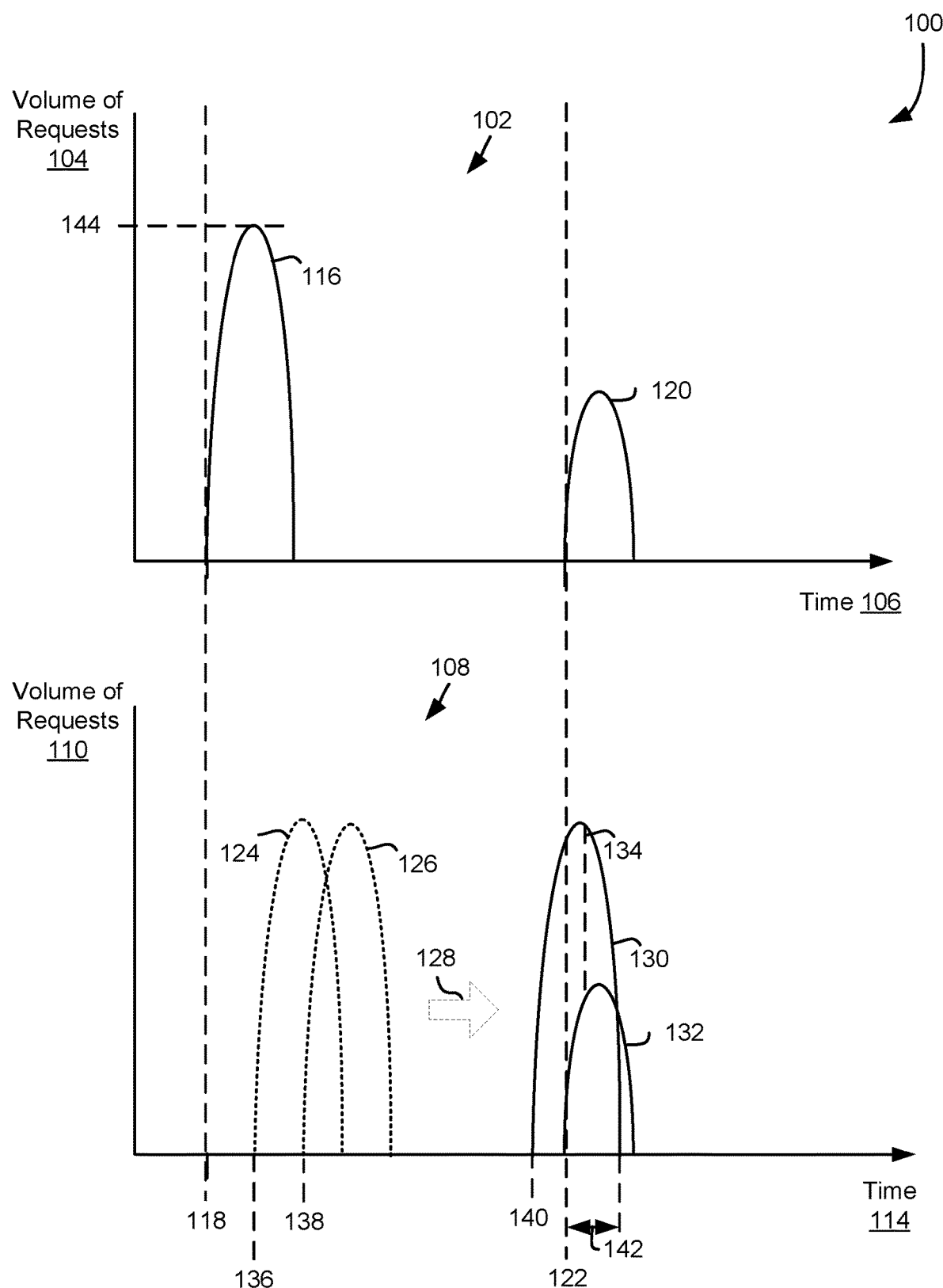
FIG. 1 illustrates an example of groups of resource requests changing in time to potentially overlap at a future time, as may be addressed by the described system and methods.

The following disclosure describes systems and techniques for predicting future overlap in requests for a compute resource to address a system overload before it occurs. Requests for a resource may be tracked in time and grouped or clustered based on one or more common characteristics of the requests. In one example, requests may be organized into groups based on a time of occurrence of the requests and a period that they repeat. Once clustered, different groups of requests for the resource may be tracked across at least one dimension to generate tracking data. In one example, the at least one dimension may be a periodic time of occurrence. In other examples, the at least one dimension may additionally or alternatively include a volume of requests, a length of time of each occurrence of a group, or other metric or attribute of the requests that could contribute to an overlap of requests in the future. Based on the tracking data, predictions may be generated indicating whether the groups of resources will overlap at a future time. In some cases, it may be determined whether the overlap in resource requests will cause the system to experience an overload condition, such that processing the requests and delivering the desired computing resource of service may be delayed or prevented. In some cases, this may include combining the resource requests at the time of overlap and comparing the result to a threshold request processing value.

In the event an overload condition is predicted, the resources provisioned to process the requests may be increased or new resources added, to prevent or reduce the likelihood of a system overload at the future time. In other examples, a notification of the potential system overload condition may be generated and delivered to one or more users, in order to warn of the predicted overload condition and/or change user behavior to remedy the predicted overload condition.

In some aspects, grouping requests may include clustering or genericizing and combining the requests based on at least one common or similar characteristic. The characteristic may include a periodic time of occurrence, such that requests for the same resource that occur close in time and with the same or relatively same periodicity may be grouped together. In some examples, requests may be clustered into a group, such that each group is represented over a time period. In some cases, requests may be grouped by first genericizing the requests to remove details of the requests and then combining the request to result in a single request per group. The resulting group may be represented as a single point in time or over a time period encompassing times of occurrence of the requests in the group.

In some aspects, the groups of requests may have different, but relatively consistent, time intervals of occurrence or periodicity. In this example, predicting future overlap or collisions between different groups may include extrapolating each time interval into the future and determining when they overlap. In other cases, the time of occurrence of one or more groups of requests may be changing over time (e.g., changing from one period to the next according to some type of determinable pattern). In this example, predicting future overlap may include determining when the change will cause an overlap with another group. In yet other examples, other dimensions of at least one of the groups may change over time. This may include a time period over which requests are received (e.g., width of a group of requests represented in time). In these and other examples, the time difference between at least two request groups may be determined and tracked across multiple time periods, where the time period may be the greater of the two time periods of the respective request groups. In cases where the time difference is decreasing, the amount of decrease per period may be used to predict an overlap at a future point in time.

In some cases, the occurrence of multiple request groups in multiple time periods may be tracked. In these cases, a system overload condition may occur when three or more groups overlap, thus producing a combined request volume that is greater than a system threshold. In these cases, predicting when the groups will overlap may include tracking any number of groups of requests and predicting or extrapolating their occurrence into the future.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described. While the described techniques are described primarily in the context of accessing data from data storage, such as one or more databases, it should be appreciated that the descried techniques may find useful application in a variety of computing resources that experience periodic requests or interactions, where at least one aspect of the requests or interactions change to potentially collide or overlap. Stated another way, the described techniques apply to any type of computing resource that has experienced change in requests to access that resource in at least one dimension, including bursty or inconsistent traffic at various times.

As one skilled in the art will appreciate in light of this disclosure, certain embodiments may be capable of achieving certain advantages, including some or all of the following: (1) reducing or preventing system overload by predicting when overloads will occur in the future and provisioning new resources to address the predicted overload; and (2) increasing utilization of computing resources by preventing system overload.

FIG. 1 illustrates an example 100 of groups of resource requests changing in time to potentially overlap at a future time, as may be addressed by the described system and methods. Diagram 100 shows a representation of requests to access a resource, such as provided by a computing resource service provider, in two distinct time periods 102 and 108. Periods 102 and 108 are only illustrated for purposes of explanation. It should be appreciated that requests may occur in any number of time periods, such that they repeat many times over, with the length of the periods 102, 108 being consistent or different. The requests are represented by groups 116, 120, 124, 126, 130, and 132 occurring at different times in time periods 102 and 108, where volume of requests is indicated on the vertical axis 104, 110, and time on the horizontal axis 106, 114.

In the illustrated example, a first group of requests 116 may begin at time 118 in period 102. The group 116 may have a certain peak volume 144. Group 116 may represent a periodic spike in requests to access a resource, such as a database, for example. Later in period 106, a smaller group of requests 120 may occur, such as at time 122. Period 102 may represent any amount of time, such that at least two groups of requests occur within that period. Using the techniques described herein, the occurrence of the groups of requests 116, 120 may be tracked and used to predict an overlap of the two different groups 116, 120 at a future time.

In the example illustrated, groups 124 and 126 may represent group 116 occurring at future times. As illustrated, group 124 may occur at time 136 in a future period, which is a change relative to time 118 at which group 116 may occur in period 102. Similarly group 126 may occur at a different relative time 138 in period further in the future.

The difference between times 118, 136, and 138 may be tracked, for example, and that change in time (e.g., representing a shift in time of the occurrence of the request group) may be used to predict 128 the occurrence of same request group, represented by group 130 at time 140. Similarly group 120 may be tracked over multiple periods and based on the tracking, may be predicted to occur as group 132 at time 122 during period 108, such that it is not predicted to move in time.

In this example, groups 130 and 132 may be predicted to collide or otherwise overlap during a time period 142, where the combined volume of requests between the two groups 130 and 132 may be the largest at time 134. In this example, the combined volume of the requests of groups 130 and 132 may be compared to one or more threshold values for the system being accessed to determine if the predicted combined volume of requests will overwhelm or overload the system. If so, actions may be taken to reduce or prevent the occurrence of the overload system state, such as by provisioning new resources and/or providing a notification to one or more devices generating or managing the requests (e.g., a subscriber of the services).

As described herein, a group or cluster of requests may be associated with a time of occurrence. The time of occurrence may refer to a time window during which the requests in the group occur, or may be a single point in time selected to represent the group or cluster, such as a time corresponding to the peak number of requests, a time of the first request of the group being received, a time of the last request of the group being received, or any other time selected to represent the group of requests. As also used herein, two or more groups may collide or overlap when at least one request from each group overlaps in time. In some cases, a group overlap or collision may be defined by the number of requests overlapping at one point in time being above a total request volume threshold (e.g., total number of requests, number of requests per second, size of requests, etc.), such that only overlaps that could potentially cause a system overload would be identified and labeled as an overlap. In some aspects, a system overload may be defined by one or more static thresholds, such as one or more capacities or capabilities of resources responding to the request, including a cache size limit, response times or latency, etc. In some cases, an amount of time that requests from two different groups occur can be used to define an overlap condition (e.g., when two groups overlap for greater than x milliseconds).

In some examples, groups may overlap when the time to process the requests overlap or when the requests themselves are received. For example, although requests may not overlap in the time they are received, the time required to respond to the requests may overlap, such that would cause a system slowdown. In some example, the size of the requests may cause or contribute to the overlap condition, such that one or multiple requests of a larger size (e.g., including large in terms of data included in the request, data to be accessed according to the request, etc.) may directly or indirectly cause an overlap, that could lead to a system overload. It should be appreciated that any of the above dimensions may be used alone or in various combinations to track and predict request overlap, via the techniques described herein.

Figure 2:
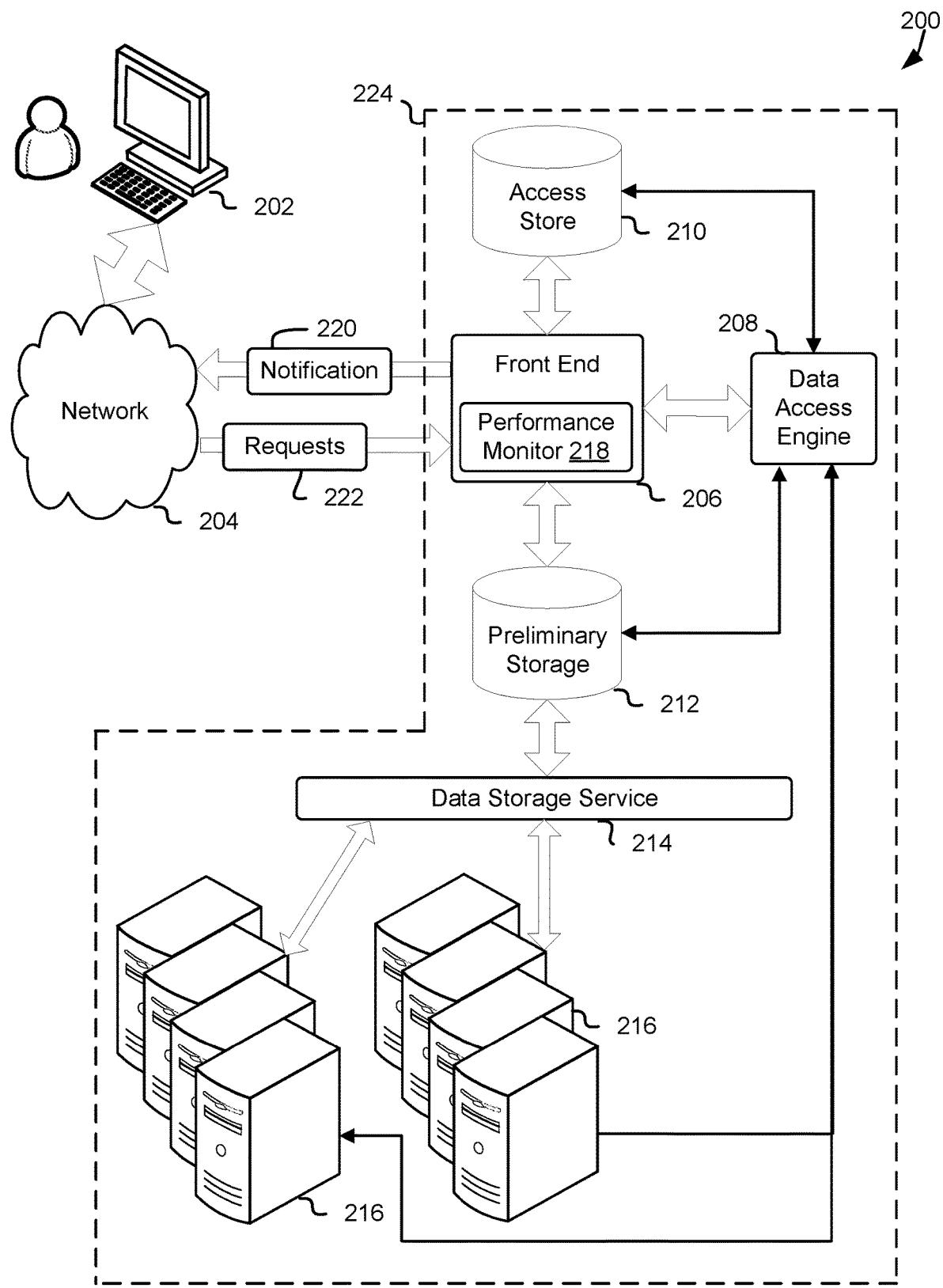
FIG. 2 illustrates an example of an environment where resource requests may be tracked and predictions as to system overload may be generated and used to change resource allocations and/or generate notifications to change user behavior.

FIG. 2 illustrates an example of an environment 200 where resource requests may be tracked and predictions as to system overload may be generated and used to change resource allocations and/or generate notifications to change user behavior.

A customer or client device 202 connects, via a network 204, with the front end 206 of, e.g., a computing resource service provider 224 providing a data storage service 214, so as to access data stored and managed by the data storage service 214 through preliminary storage 212, and durable storage 216 associated with data storage service 214, via one or more requests, statement, or queries 222. The requests 222 may occur over time, such that at some points in time, more requests are received by front end 206 than at other times. As may be contemplated, the client device 202, or some other actor (such as that of the computing resource service provider), may also request access to one or more sets of data stored by the data storage service 214. In some embodiments, information regarding the sets of data to be accessed may be recorded in an access table, which may be stored in an access store 210. The recorded information may include the identity of the data to be accessed, the time at which the request was received, identity of the user (e.g., customer of the computing resource service provider) requesting the data and/or that of the data to be accessed, the identity of the data's location within durable storage (e.g., the identity of the volume(s) or blocks on which the data is presently stored), and the like. The access requests recorded in the table are orchestrated by the access engine 208, either synchronously with the request or asynchronously, depending on the implementation.

While computing resource service provider 224 is illustrated as providing data storage services, it should be appreciated that the described techniques are equally applicable to a variety of computing resources and services whereby requests for the services may be periodic and may change over time. For example, in some aspects, the computing resource service provider 224 may be an entity that provides computing resources, such as data storage services, virtual computer system services, and/or web services. Customer via one or more devices 202 of the computing resource service provider may communicate with one or more of the services via an interface, which may be a web services interface or any other type of customer interface. Each service provided by a computing resource service provider may have its own interface and subsets of the services may have corresponding individual interfaces in addition to, or as an alternative to, a common interface. The computing resource service provider 224 may provide access to one or more host machines, may provide access to one or more virtual machine instances as may be operating thereon, or may provide access to one or more services in an environment therein. The one or more services provided by the computing resource service provider 224 may also be implemented as and/or may utilize one or more virtual machine instances as may be operating on host machines operating within the computing resource service provider 224 environment. For example, the computing resource service provider 224 may provide a variety of services to users, where users may communicate with the computing resource service provider 224 via an interface such as a web services interface or any other type of interface via one or more client devices 202. Computing resource service provider 224, and/or subsystems thereof, may be implemented by one or more of web servers or application servers 906 and 908, utilizing data store 910, accessed via network 904, as will be described in greater detail below in reference to FIG. 9.

In an example of a type of service operating within the environment of the computing resource service provider 224, a virtual computer system service may be a collection of computing resources configured to instantiate virtual machine instances on behalf of a customer such as a user via client device 202. The customer may interact with a virtual computer system service (via appropriately configured and authenticated API requests) to provision and operate virtual machine instances that are instantiated on physical computing devices hosted and operated by the computing resource service provider 224. The virtual computer system service may provision the instance by instantiating the instance, configuring the instance, and providing resources to run the instance. The virtual computer system service may also be configured to manage virtual machine instances to, for example, instantiate virtual machine instances and/or to manage the migration of virtual machine instances. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

The client device 202 may be any computing resource or collection of such resources enabling the customer to interface with the data storage system, such as in a programmatic fashion (e.g., via web service call or application programming interface call), and access data therewith. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The network 204 may be a communication network, such as the Internet, an intranet or an Internet service provider (ISP) network. Some communications from the client device 202 to the data storage system may cause the data storage system to operate in accordance with one or more embodiments described or a variation thereof. The front end 206 may be any entity capable of interfacing via a network 204 with a client device 202, as well as various other components of a data storage system, so as to coordinate and/or direct data and requests 222 to the appropriate entities. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices, including both directional and omnidirectional or non-directional media (such as hard drives, optical drives, solid state devices, virtual storage devices such as provided by the computing resource service provider, and the like), services (e.g., such as those accessible via application programming interface calls, web service calls, or other programmatic methods), and the like.

The sets of data stored and made accessible by data storage service 214 may be produced by a program, process, application, module, service, or system associated with a computing resource service provider as described herein. The set of data may also be produced by a user or customer of the computing resource service provider, and submitted to the computing resource service provider via a client device 202 and transmitted via a network 204. The set of data may include volatile data, which may be added to, changed, and/or deleted from in response to, for example, one or more requests (e.g., application programming interface requests or "API requests") made by the user or customer of the computer system. The set of data may also include non-volatile data (also referred to herein as "static data"), which may be at least partially unchanging as the one or more requests are received.

In some aspects, preliminary storage 212 may comprise one or more caches that assist in retrieving data from data storage service 214. In some cases, the cache(s) 212 may obtain and store a copy of data retrieved from data storage service 214 to enable faster presentation of the data to a client device 202. In some aspects, the cache 212 may perform one or more operations on data accessed from data storage service 214 and save the data, as modified by the one or more operations. In this case, by storing the modified data, the cache 212 may be able to present the modified data quicker by accessing the local copy, than by retrieving the data again from data storage service 214 and performing the one or more operations on the data. In some examples, the preliminary storage 212 is a virtual and/or shared data storage volume that is mapped to a physical storage volume such as, for example, a disk drive, a solid state disk drive, computer system memory, magnetic tape, or some other optical storage device. As may be contemplated, the types of data storage volumes used for the preliminary storage 212 described herein are illustrative examples and other types of data storage volumes used for the preliminary storage 212 may be considered as within the scope of the present disclosure. For example, in some aspects, the preliminary storage 212 may include a magnetic disk drive (e.g., a spinning disk drive or a solid state disk drive), computer system memory, magnetic tape, or some other optical storage device.

In some cases, the front end 206 may also include a performance monitor 218 that monitors and tracks requests 222. The performance monitor 218 may group or cluster the requests into one or more groups based on the attributes or characteristics of the requests. The performance monitor 218 may track changes in the groups of requests 222 across at least one dimension, such as periodicity, volume, length of occurrence of requests in a group, etc., to generate tracking data. The performance monitor 218 may, using the tracking data, predict whether and at what time the groups of requests 222 may overlap or collide, across the at least one dimension. In some aspects, the performance monitor 218 may determine a total volume of requests at the point of the collision or overlap. The performance monitor 218 may compare the total volume of requests at the one or more collision points to a system request threshold to determine if the request collision will cause a system overload, and generate and send one or more notifications 220 to client device 202, to warn of a potential system overload.

In some aspects, multiple different performance monitors 218 may be implemented as separate processes, and/or on separate compute resources, to track and/or generate predictions for different dimensions associated with the requests/groups of requests. The results of the different performance monitors 218 may be combined by a master performance monitor or other process to generate predictions as to whether and to what extent requests and groups of requests will overlap in the future.

In some aspects, a specific resource of the computing resource provider 224 may generate or supply a threshold, or the performance monitor 218 may determine one or more thresholds for various subsystems of computing resource service provider 224. In some aspects, the one or more thresholds may relate to the capability of one or more resources, such as processing limits, cache size, etc. The thresholds may be determined heuristically, obtained form the resource itself, and so on. In one example, the preliminary storage 212, which may implement one or more caches for accessing data from persistent storage 216, as will be described in greater detail below, may provide a cache request threshold. In this example, the performance monitor 218 may compare a total volume of requests at one or more points in time in the future to the cache threshold to determine if a system overload condition is predicted to occur.

A system overload may include data storage service 214 and/or computing resource service provider 224 taking a longer time to process requests 222 or becoming incapable of processing requests 222. Upon predicting that a system overload will occur, the performance monitor 218 may cause data storage service 214 or computing resource service provider 224 more generally, to provision additional resources to reduce or prevent the predicted occurrence of system overload. In some cases, either additionally or alternatively, the performance monitor 218 may send a notification 220 to client device 202 indicating the potential for system overload, so that the client device 202 may change its behavior to avoid the system overload, or may manually request an increase in resources provisioned to process requests 222.

In some aspects, a system overload condition may occur as a result of one or more dependent systems of the computing resource service provider 224 being overloaded in processing requests. For example, an increase in request volume for a specific resource (e.g., data storage service 214) may trigger an event that depends on another system (e.g., preliminary storage 212). While the specific resource may not become overloaded by the request volume, the other dependent system may become overloaded, such as would cause a system slowdown in responding to the requests. In this scenario, system dependencies may be obtained or determined (e.g., by monitoring response times and the like), and used to inform when a system overload will occur and at what request volume (or size or other dimensional) threshold. In some aspects, the primary system or one or more dependent systems may be the basis for setting one or more thresholds at which a system overload condition will occur, thus informing when a predicted overlap will cause a system overload condition. In some aspects, the overload condition, and/or one or more thresholds used to indicate the overload condition may be further based on other factors, such as time of day (e.g., peak hours for usage of a resource) or usage of one or more dependent systems by another system that would interfere with the dependent system responding to the requests at a typical or expected rate. In other examples, the performance monitor 218 may send notification 220 to an autoscaling service, either that is part of the computing resource service provider 224 or a separate service, to automatically adjust resources provisioned for customer 202 to avoid or increase the chances of avoiding a system overload condition.

In an embodiment, the preliminary storage 212 is a plurality of storage devices that are used to redundantly store the data using techniques such as, for example, bundle encoding, grid encoding, or replicated storage. For example, the preliminary storage 212 may store the data by distributing the data to a plurality of data shards (e.g., putting a first portion of the data in a first data shard and a second portion of the data in a second data shard) and generating one or more derived shards based on those data shards. In another embodiment, the preliminary storage 212 is one or more storage devices that store redundant copies of the data as received. In yet another embodiment, the preliminary storage uses a combination of the storage techniques described herein by, for example, storing a single copy of the data for a first time period (e.g., thirty minutes), storing multiple copies of the data for a second time period (e.g., one day), using redundant storage techniques such as grid or bundle encoding to store the data for a third time period (e.g., thirty days), and then moving the data to more durable storage 216 using the data storage service 214 as described herein.

The set of data may be stored in the preliminary storage 212 in an unaltered form (e.g., not processed, compressed, indexed, or altered prior to storage). The set of data may also be stored in the preliminary storage 212 as, for example, original data (also referred to herein as an "identity shard") such as the original data shards described herein. In an embodiment, the set of data stored in the preliminary storage 212 is stored without indexing and without any redundancy encoding. In another embodiment, the set of data stored in the preliminary storage 212 is stored with null redundancy encoding (i.e., a redundancy encoding that maps the data to itself). The data in preliminary storage may be stored as raw data, or may be bundle-encoded, or may be grid-encoded, or may be stored using some other method.

In some embodiments, the set of data is migrated from the preliminary storage 212 to a data storage service 214 for storage in a durable data storage system 216. Similarly, upon receiving an access request for data stored in the data storage system, data may be temporarily retrieved from durable data storage system 216 and stored and compiled in the preliminary data store 212 prior to presentation to the client device 202. In some of such embodiments, the migration may occur after a determined time period passes. The determined time period is selected so as to allow for the Shannon entropy of the system, e.g., keyed at least in part to the volatility or expected volatility of the set of the data, to decrease either on its own accord or via some active process (e.g., implemented by an entity of the computing resource service provider). Conversely, data that does change frequently (e.g., highly volatile data) may not be migrated to durable storage at all and may, for example, be migrated to a different storage service as described herein, or simply remain in the preliminary storage 212.

When the data is migrated or otherwise stored on the data storage service 214, the data storage service 214 may store the data using one or more redundancy encoding techniques. For example, the data storage service 214 may encode the data by producing one or more data shards and may store the one or more data shards on one or more volumes of a set of volumes of durable data storage system 216 configured to store the redundancy encoded data as described herein. Depending on the redundancy encoding technique used by the data storage service 214, some or all of the shards stored may consist entirely of original data (identity shards) or derived data (derived shards). In some embodiments, the shards may be apportioned on a one-to-one basis to the volumes 216 of the durable storage. Accordingly, in such embodiments, some volumes may include directly readable, original data (identity shards), while others contain only derived data (derived shards).

It should be noted that, as used herein, the durability of data and/or data storage may be separate from the redundancy of the data in the data storage. For example, data stored in preliminary storage 212 may be highly durable (i.e., have a very low failure rate) but may not be redundant if, for example, it is stored as a single copy. Conversely, data stored using one or more redundancy encoding techniques such as those described herein and while such data may be less durably stored (i.e., may have fewer "9's" of durability), it may be highly redundant. For example, data stored in a grid may have no fewer than four separate copies of the data (one of the data shards, one from the horizontally derived shards, one from the vertically derived shards, and one from the remaining shards). If the grid is geographically distributed into, for example, multiple datacenters, the data may have greater redundancy due to the added tolerance for loss of a complete datacenter.

During or after the storage process just described, a customer, through the client device 202, may request access to a portion of the data stored and managed by the data storage system or service 214. As may be contemplated, to help facilitate efficient access to the data, an access engine 208 is employed to orchestrate efficiently accessing data from the data storage system. In some embodiments, the access engine 208 may obtain locations within the durable data storage system 216 of certain portions of sets of data, for example, corresponding to data indicated in a request from a client device 202 to access data. In some examples, these locations may indicate certain blocks of data, for example, when the durable data storage system 216 provides block-level data storage. The access engine 208 may map the data blocks to a number of nodes in generating a directed graph for accessing the data. The access engine 208 may determine or obtain cost values associated with accessing different blocks of data in different orders. Based on these costs for certain paths between the data blocks, represented by nodes, the access engine may generate a master path for accessing the requested data. The data access engine 208 may then instruct the data storage service 214 to retrieve the requested data and compile the requested data in the preliminary store 212. Upon retrieval of all the requested data, a subset thereof, a time period elapsing, or a number of other factors, the front end 206 may facilitate transferring the retrieved data from the preliminary store 212 to the client device 202, for example, via network 204.

In some cases, in connection with receiving an access request, an access table that may, for example, be stored in access store 210, is updated with information regarding the data to be accessed. The recorded information may include the identity of the data to be accessed, the time at which the request was received, identity of the user (e.g., customer of the computing resource service provider) requesting the data and/or that of the data to be accessed, the identity of the data's location within durable storage (e.g., the identity of the volume(s) on which the data is presently stored), and the like. Either synchronously with the request (or the recording of the access request in the access table), or asynchronously therewith (e.g., at some point thereafter), the access engine 208 begins processing the requests recorded in the access table. In some embodiments, the requests recorded in the table are queued in an ordered queue, and the access engine 208 processes the requests in the order prescribed by the queue. In some embodiments, an entity of the computing resource service provider, such as the access engine 208 itself, sorts and batches the requests to improve efficiency.

The access engine 208 may be any computing resource or collection of such resources capable of interacting with other components of the computing resource service provider, so as to orchestrate and execute the access process as implemented. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., via application programming interface calls, web service calls, or other programmatic methods), databases (which may be implemented on one or more of the foregoing examples), and the like.

The access store 210 may be any computing resource or collection of such resources capable of storing information related to stored data, such as an access table identifying data to be accessed, and either storing and/or interfacing with one or more resources to provide that information regarding the access of data to other entities, such as the access engine 208, or other components of the computing resource service provider 224, such as the volumes of the data storage service. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., via application programming interface calls, web service calls, or other programmatic methods), databases (which may be implemented on one or more of the foregoing examples), and the like.

Figure 3:
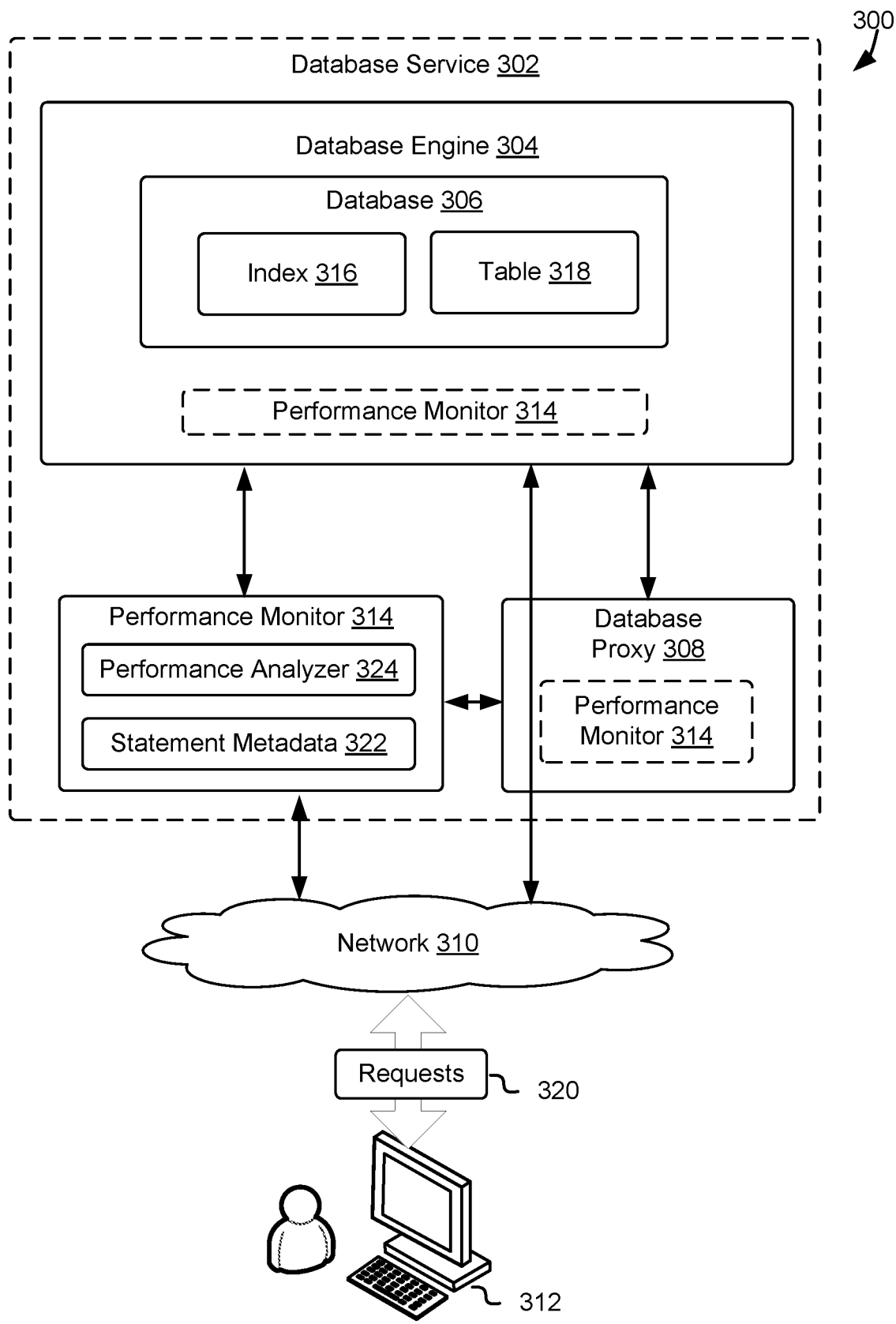
FIG. 3 illustrates an example database environment in which the described techniques for predicting resource request overlap may be implemented.

FIG. 3 illustrates an example database environment 300 in which the described techniques for predicting resource request overlap may be implemented. As illustrated, a database service 302 may implement a database engine 304 supporting multiple databases 306. In some aspects, database service 302 may utilize a database proxy 308 to facilitate communications via network 310 with one or more users or clients 312. The database service 302 may also include a performance monitor 314, which may be a stand-alone process or component, part of the database proxy 308, or part of an indicial database 306, or a combination thereof. In some aspects database service 302 may be an example of or include one or more aspects of data storage service 214 and/or computing resource service provider 224 more generally. Database service 302 may be implemented by one or more of web servers or application servers 906 and 908, utilizing data store 910, accessed via network 904, as will be described in greater detail below in reference to FIG. 9.

Users 312 may interact with a database service 302 across one or more intermediate networks 310 (e.g., the internet) via one or more interfaces, such as through use of API calls, via a console implemented as a website or application, etc. The interfaces may be part of, or serve as a front-end to, the database service 302 that includes backend services supporting and enabling the services that may be more directly offered to customers.

The database service 302 may be implemented as one or more systems or processes executed by one or more computing devices of a computing resource service provider. The database service 302 may be a managed service that makes it easy for users to set up, operate, and scale databases 306 in the form of database instances (not illustrated). The database service 302 may rely on the virtualization techniques to allocate the compute and storage resources to provide a database instance. For example, the database service 302 may provision resources of one or more host devices to host a database instance. The database service 302 may provide resizable capacity while managing time-consuming database administration tasks. The database service 302 may provide one or more of a variety of database engines 304 (e.g., relational database engines such as MySQL, MariaDB, Oracle, SQL Server, PostgreSQL, etc., and/or non-relational database engines) allowing existing code, applications, and/or tools to work seamlessly with databases provided by the database service 302. In some embodiments, the database service 302 may perform administrative tasks such as automatically backing up databases, upgrading and/or patching database software, scaling the compute resources or storage capacity associated with its database instances, etc.

Users 312 of the database service 302 may interact with the database service 302 to implement one or more databases 306, which may include the user 312 utilizing a console of a web-based application to issue one or more requests to an endpoint associated with the database service 302 indicating the user's 312 desire to launch/configure one or more databases 306. A management engine or controller (not illustrated) of the database service 302 may then, in response, perform operations to obtain compute resources (e.g., virtual machines (VMs) executed by host device(s)) for the database 306 instance(s), launch VM images (optionally having code for the database pre-installed), optionally launch or install databases on the host device(s), configure the database instances, configure security rules and/or permissions used by the databases 306 or used for accessing the databases, etc.

Thereafter, database clients 312 may issue queries to a database 306 instance to read/write data from/to the database. Such database client applications may be executed by electronic devices. As used herein and commonly in the field, the terms "statement," (e.g., text that indicates a command to a database, such as a SELECT statement, UPDATE statement, DELETE statement, etc.) "query," (e.g., SELECT statements or other commands to retrieve data based on specific criteria) and "request" may be used somewhat interchangeably and are to be interpreted as such unless otherwise indicated or made clear by the context of use.

In some aspects, database clients 312 may interact with databases via a database proxy 308, which may be implemented using software that is communicatively coupled between the client applications and the databases 306. A database proxy 308 may be deployed in a transparent manner and thus provide interactions between database clients and databases according to a same database interface so that the database clients and databases behave as if communications were directly passed between the database clients and databases. For example, the database proxy 308 may receive access requests (e.g., database queries) from database clients formatted according to a database interface, may optionally process these requests, and pass on the requests to the databases. Similarly, the database proxy 308 may receive responses from the databases, optionally process these responses and modify them, and pass on the original responses or modified responses back to the clients.

These interactions between database clients, database proxies, and/or databases as described herein may be implemented according to different technologies, including, but not limited to, utilizing vendor-specific native application programming interfaces (APIs) or APIs utilizing Simple Object Access Protocol (SOAP) or Representational State Transfer (REST) technologies. SOAP is a protocol for exchanging information in the context of network-based services. REST is an architectural style for distributed hypermedia systems. A RESTful API (which may also be referred to as a RESTful network-based service) is a network-based service API implemented using HyperText Transport Protocol (HTTP) and REST technology. The interfaces described herein may in some embodiments be wrapped with client libraries in various languages, including, but not limited to, C, C++, Java, C#, and Perl to support integration with databases, such as databases 306.

Database 306 may include a database index 316 that is a data structure that improves the speed of data retrieval operations on a database table 318. Indexes are typically used to quickly locate data (e.g., using a small data structure, that may reside within a relatively "fast" memory such RAM or be loaded into RAM from a disk, etc.) without having to search every row in a database table (e.g., perform a table scan, which often involves reading from a persistent-type storage medium such as a magnetic disk or SSD) every time a database table is accessed. Indexes are typically created using one or more columns of a database table, providing the basis for both rapid random lookups and efficient access of ordered records. An index typically is a copy of selected columns of data from a table (such as a column of unique identifiers in the form of integers, which can be searched very efficiently) that may also include low-level disk block addresses/links pointing to the complete "row" of data it was copied from (which typically includes other larger data elements of interest).

Turning to FIG. 3, one or more clients 312 may issue statements/queries (shown as statement requests and responses 320) involving one or more databases 306 to be processed by one or more database engines 304, which return results to the client(s) 312 in the form of responses. These queries may be processed by the database engine 304 using one or more indexes 316, each referencing one or more (and typically fewer than all) columns of one or more tables 318.

In some embodiments, the performance monitor 314 may be implemented (e.g., as a software module) of a database proxy 308, and thus may directly receive and have visibility into the statements 320 being issued. For example, the performance monitor 314 may act as a transparent proxy and may have access to the plaintext statements being sent in traffic before forwarding on the traffic, or the performance monitor 314 may act as a reverse proxy and thus terminate connections with the client(s), allowing the performance monitor 314 to (optionally) decrypt statement traffic sent in an encrypted form (e.g., via TLS). Other related proxy deployments can also be used known to those of skill in the art. The performance monitor 314 may also be implemented as a module within a particular database engine, that is implemented as part of database engine 304, or as a separate entity, which may (or may not) be a part of a same database service 302 as that which provides the database engine(s) 304. Alternatively or additionally, in some embodiments the performance monitor 314 is not communicatively coupled inline between clients and the database engines, but rather indirectly detects the statements.

For example, in some embodiments the performance monitor 314 may periodically send requests to the one or more database engines 304 for information describing what queries each is currently processing, which is returned to the performance monitor 314. In some aspects, information of queries being received/handled by database engines 304 may be published centrally and accessed by the performance monitor 314. Alternatively, the performance monitor 314 may monitor some sort of log(s) written to by the database engine(s) 304 that include the queries themselves, or the database engines could be modified to store/write incoming queries (or "cleansed" versions thereof, such as to remove confidential or sensitive information) to some location— e.g., a database table, in file(s) at a storage location (e.g., of a storage service), to a monitoring service, etc.

In some aspects, statements to access database 306 or more generally data stored by database service 302 maybe be monitored and tracked, to enable predications of future request volume overload, by a performance monitor 314. In some cases, the performance monitor 314 may include a performance analyzer 324, which may process the queries to generate and update statement metadata 322. Statement metadata 322 may take the form of or include tracked data that includes the occurrence of different requests or statements 320 and other data related thereto. The performance monitor 314 may cluster or group various queries together based on the metadata 322. As many queries are built by application code, they tend to look the same or extremely similar. The performance monitor 314 may identify these patterns, where only some values/parameters change, to identify groups of queries. Grouping of queries may be based on time of occurrence, time period of repetition or time interval of occurrence, volume of requests, database 306 accessed, or other features of the requests, etc. The metadata 322 may also include and track other attributes of the requests, such as volume, how the volume changes over time, a time window in which groups of requests occur, and so on. Based on this tracking data, the performance monitor 314 may then predict if and when these groups of requests will overlap, and for example, either change resource allocations to better handle the requests or send a notification to client 312 to warn the client of a potential system overload condition, in which performance may be degraded.

Figure 4:
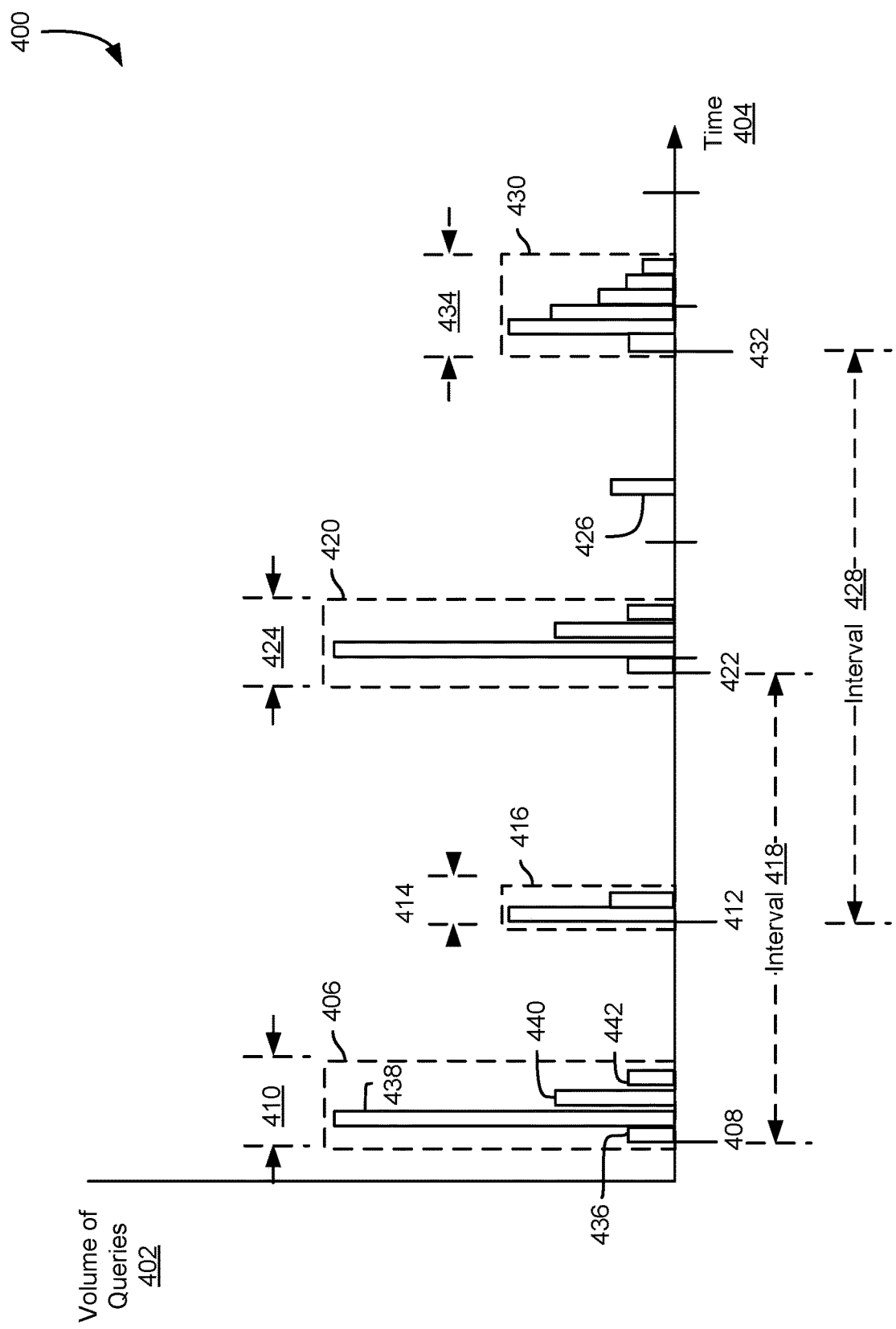
FIG. 4 illustrates an example of groups of resource requests changing in time, as may be addressed by the described system and methods.

FIG. 4 illustrates another example diagram 400 of groups of resource requests changing in time, as may be addressed by the described system and methods. As described herein, resource requests may be grouped, tracked to generate tracking data, and based on the tracking data, predictions may be made as to if and when the groups of requests may overlap in the future. As illustrated, multiple requests may be received over a time 404, represented on the horizontal axis of diagram 400. Different blocks of requests 436, 438, 440, 442 may be received within a first time window 410. Each of blocks of requests 436, 438, 440, 442 may represent a number of requests (illustrated via height of the respective blocks), occurring at one point in time or a relatively small time window (fractions of a second up to one to a few seconds). Blocks of requests 436, 438, 440, 442 may be associated with various characteristics and may represent a database request or statement, as described above. These blocks of requests may occur multiple times over a given time window, such that the requests occur periodically or substantially periodically. These requests may represent requests to access data, for example to display on a website, and may occur substantially regularly at different times of the day (e.g., accessing the morning news at certain times, different time zones, then later in the day accessing the evening news, etc.). The volume of requests may be tracked for two or periods to determine an interval of occurrence, represented by an interval, such as interval 418 and 428. A number of requests occurring periodically within a certain, configurable time window, may be grouped together to form a group of requests 406. Based on the tracking, an interval 418 of occurrence of similar requests may be determined, such that the interval 418 defines the time between a similar volume of requests occurring (and/or other aspects deigning a profile of the requests).

As illustrated, group 406 may occur later in time after interval of time 418 as group of requests 420 at time 422, over a time window 424. In this example, the volume of requests, individual blocks of requests, and time window 424 of the group 420 may be the same or similar to the volume of requests, individual blocks of requests, and time window 410 in the group 406. In another example another group 416 may be formed based on tracking data. This group 426 may have an interval or periodicity represented by interval of time 428, and may occur at a future time 432 as a group 430. By taking the occurrence of this group over time, the interval of occurrence 428 may be determined. In some aspects, the groups may change over time, such as group 430 occurring over a longer time window 434 than group 416 having a time window 414. In addition, one or more of intervals 418 or 428 may also change. These and other changes, across time, volume, or other characteristics or dimensions of the requests may be tracked and correlated to determine patterns of change of the requests over time. These patterns may then be used to extrapolate the groups of requests occurring in the future occurring to the determined patterns. The extrapolations may then be used to determine if the groups will overlap, and if they do when and the total volume of requests that will occur to address system overloading before it occurs.

In other examples, groups of requests may be tracked across one or more other dimensions, such as size of requests, size of responses to the request, or a combination of the two. In yet some cases, processing time or response time may also be dimensions across which requests can be tracked and used to predict request overlap in the future, such that the processing time and/or the response time may be correlated to a system overload condition or the potential to cause such a condition. In some examples, latency may be used to infer this processing time/response time or used directly to track and predict overlap that would cause a system overload condition. In yet some examples, an increase in latency, in combination with little or no significant change in requests numbers and/or overlap may be use to indicate a system malfunction or failure, such that a warning may be issued to the computing resource service provider and the like. In yet other examples, bursts in logs filling up memory of the system and potentially causing monitoring gaps may be tracked and used to predict request overlap and a subsequent system overload. In one example, a database may be configured to log traffic. An overlap in requests as described above may cause a large increase in log volume which may brownout the logging backend or cause one or more system failures, In this case, the bursts in logs may be sued to infer, track and predict request overlap that may cause a system overload.

It some cases, other blocks or groups of requests may occur, such as block 426. In some cases, these blocks may be tracked if they occur periodically. In other cases, only blocks or groups having a total volume that exceeds a threshold may be actively tracked, for example to conserve resources, as based on volume, they groups may not have a large impact other groups of requests.

As used herein, a group of requests may include any number of requests, including a single request. In some cases, the requests occurring at a same time or within a small time window may be referred to as a block of requests. A group may include any number of single or blocks or requests. A group may also be defined across any length of a time window, with the size of the window in some cases determined by a balancing of desired accuracy with computational complexity.

In some aspects, a confidence level or value (e.g., as a percentage) may be generated for a prediction of request groups overlapping at a future time. The confidence level may be determined based on a number of factors, such as how long tracking data has been obtained for one or more request groups, consistency in occurrence of one or more groups of requests, deviation in one or more other aspects of the requests, and so on. In some aspects, a confidence level threshold may be used to determine when action should be taken in response to a prediction, such as when to send a notification, when to provision more resources, etc. In one example, a confidence level may be determined by combining weighted values corresponding to a number of periods during which tracking data has been obtained for the each group and a consistency value for times of occurrence of each group. In this example, the longer a group has been tracked for (e.g., number of periods), and the more consistent the occurrence of the group has been (e.g., time window of occurrence, time interval of occurrence, etc.) the greater the confidence level will be for that group occurring at a corresponding future time with the same or similar characteristics.

In some cases, tracking data of request overlap may be used to infer or inform causes for system overload or slowdown conditions in the past. In some examples, given a window of tracking data of requests across at least one dimension, a prediction may be made backwards in time to see if any prior outages or system overload conditions occurred as the result of request overlap, in a similar way as a forward prediction may be determined.

Figure 5:
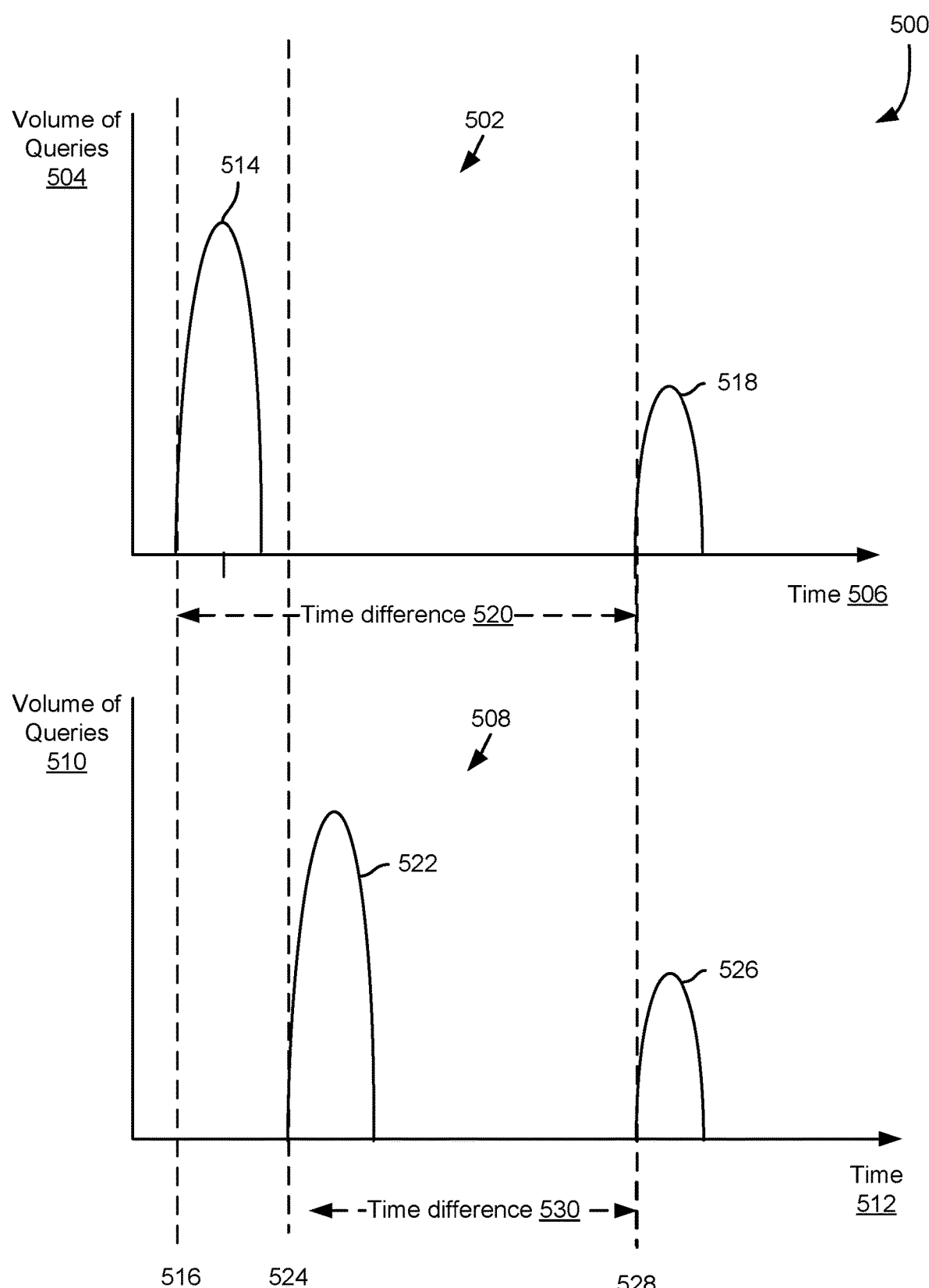
FIG. 5 illustrates another example of groups of resource requests changing in time to potentially overlap at a future time, as may be addressed by the described system and methods.

FIG. 5 illustrates another example diagram 500 of groups of resource requests changing in time to potentially overlap at a future time, as may be addressed by the described system and methods. Diagram 500 represents time on the horizontal axis 506, 512 with volume of queries on the vertical axis 504, 510, in two different time periods 502, 508. As illustrated two groups of requests 514 and 518 may occur during a first time period 502 at times 516 and 528 respectively. At a later time period 508, a request group 522, correspond to request group 514, may have moved forward in time to start at time 524. Also in period 508, group 526, which may correspond to group 518, may occur at the same or similar time 528.

In this example, based on tracking the groups 514 and 518 across two or more periods of time 502 and 508, a time difference between the groups may be determined, as represented by time difference 530 between groups 522 and 526. Tracking the change in the time difference over time may be used to predict if and when the groups will overlap. In some cases, a change in the time difference 520 and 530 may be caused by two groups 514 and 518 having different time intervals of occurrence, one or more of the time intervals of occurrence changing (such as group 514 moving from relative time 518 in period 502 to time 524 in period 508), a change in the width of a group, such a will be described in greater detail below in reference to FIG. 6, or a number of other changes in one or more dimensions of the occurrence of the requests, or characteristics of the requests themselves.

Figure 6:
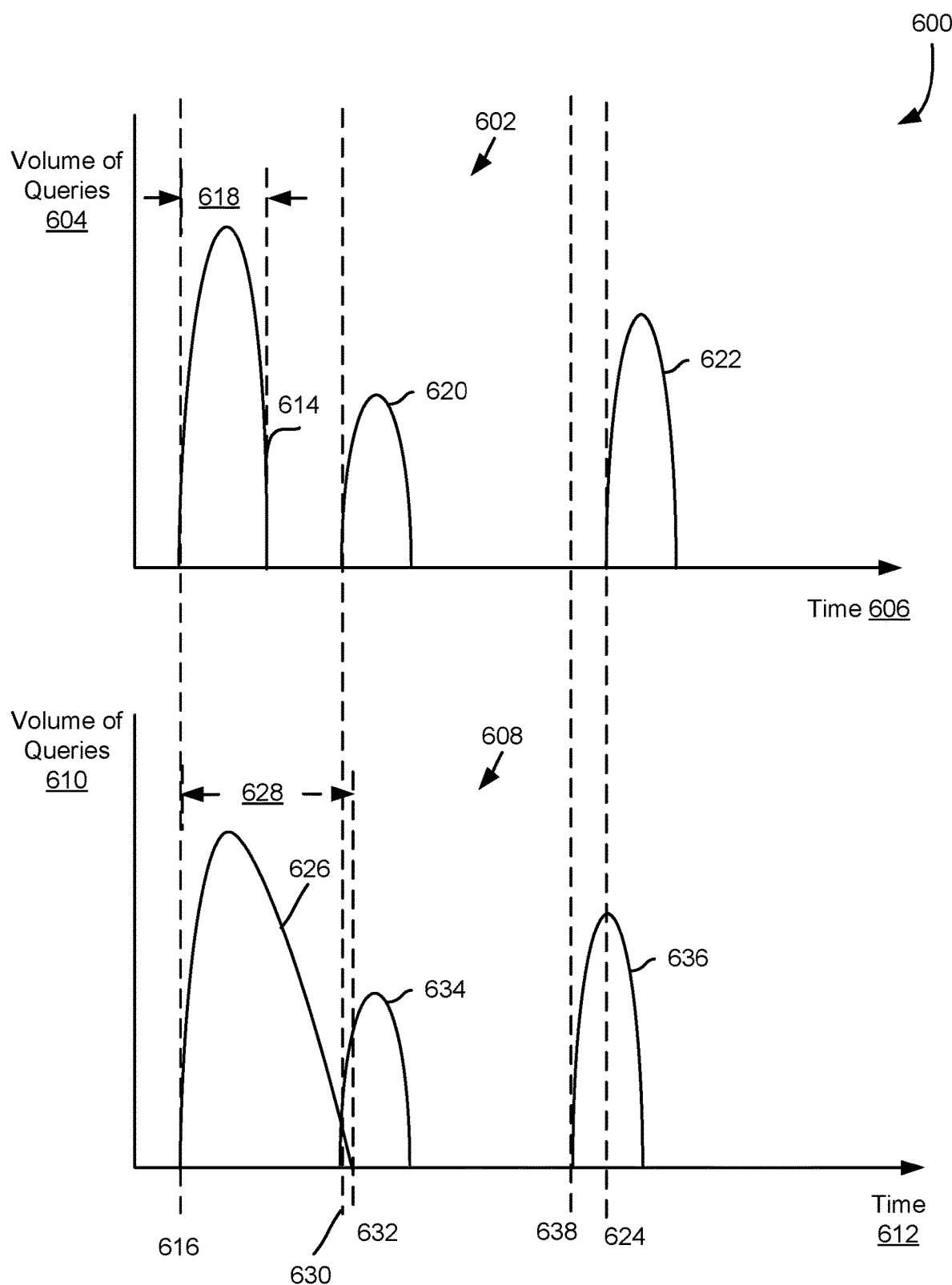
FIG. 6 illustrates another example of groups of resource requests changing, with respect to at least one dimension, in time to potentially overlap at a future time, as may be addressed by the described system and methods.

FIG. 6 illustrates another example diagram 600 of groups of resource requests changing, with respect to at least one dimension, in time to potentially overlap at a future time, as may be addressed by the described system and methods. Diagram 600 represents time on the horizontal axis 606, 612 with volume of queries on the vertical axis 604, 610, in two different time periods 602, 608. As illustrated a first group of requests 614 may occur beginning at a first time 616 during a time window 618, during period 602. At a later period 608, a time window 628 of corresponding group 626 may increase, such that it overlaps with another group 620. In this example, the overlap, which may be represented by times 630 to 632, may not result in a combined request volume that would actually cause a system overload. For example, the combined volume may be less than the volume of a single group itself. In some aspects, this or other type of comparison may be used to determine if an overlap or a potential for a future overlap may trigger a response to a potential system overload.

In some examples, the expanding of the group of requests group 626 may be extrapolated into the future, for example, based on historical data indicating a deterministic change in the size of group 626, to predict an overlap with group 634 at a future time, where the combined volume may exceed a threshold, indicating a system overload condition. In some examples, one or more other group 622, starting at time 624 may be tracked, and a rate of change of the relative occurrence of the group, as represented by group 636 in period 608 starting at time 638, may be determined. In some aspects, the period at which all three groups 626, 634, and 636 overlap may be determined to place the combined volume of the requests over the system overload threshold. To account for this type of scenario, various groups may be projected a longer time into the future to determine if an overload condition is likely to occur.

Figure 7:
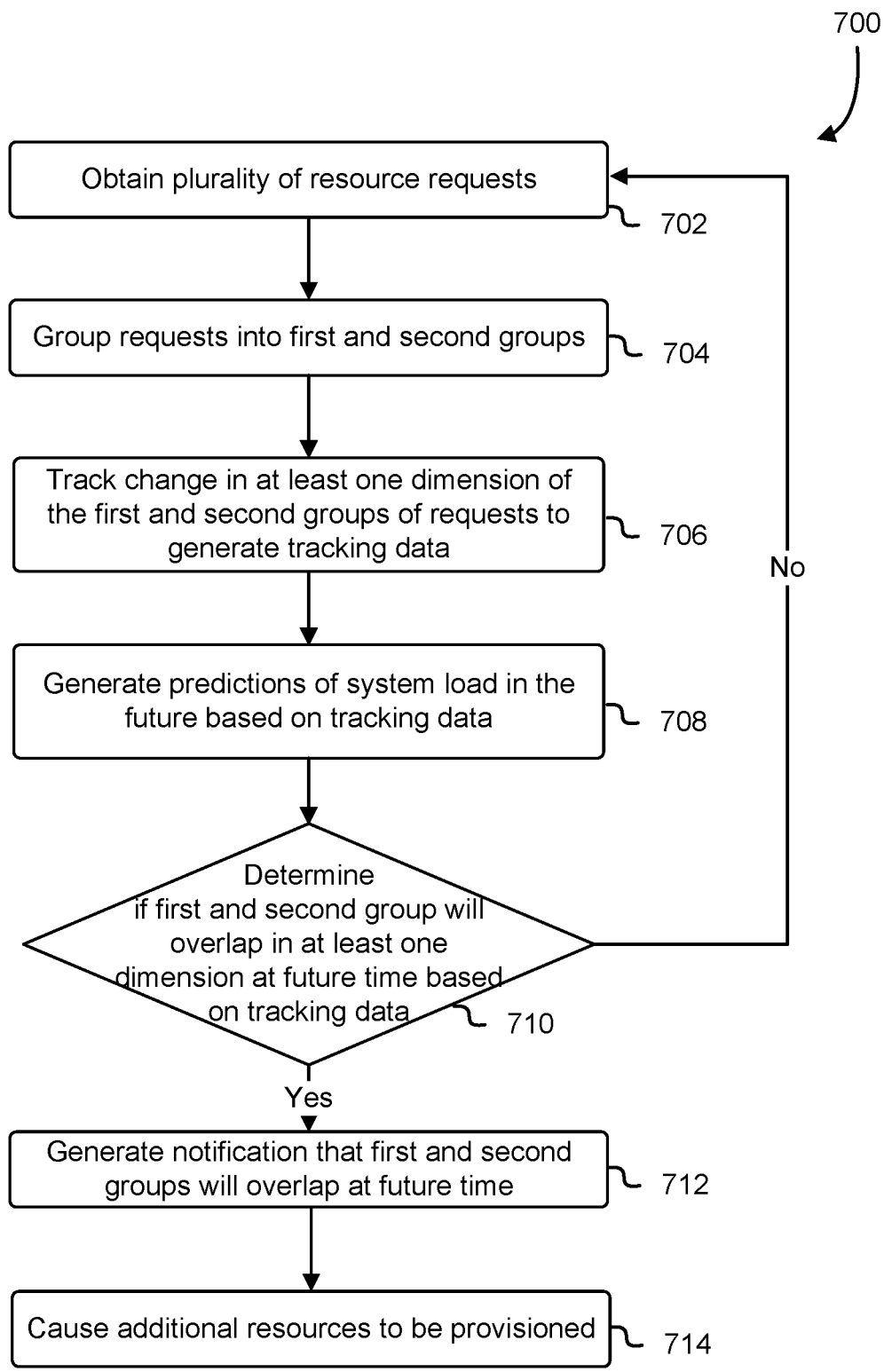
FIG. 7 illustrates an example process for predicting whether resource requests will overlap in at least one dimension.

FIG. 7 illustrates an example process 700 for predicting whether resource requests will overlap in at least one dimension. In some examples, process 700 may be performed by one or more of computing resource service provider 224, data storage service 214, and/or performance monitor 218, 314 and/or database engine 304 described above in reference to FIGS. 2 and 3.

As illustrated, process 700 may begin at operation 702, in which a plurality of resource requests may be obtained. In some aspects, operation 702 may include obtaining or intercepting the actual requests, or may include receiving metadata of the plurality of requests. The requests may then be grouped into at least a first group a second group, at operation 704, based on the requests having at last one similar characteristic or similarly in at least one dimension, such as a substantially similar time of occurrence and a substantially similar a periodic time of occurrence as described above. In some cases, grouping may include partitioning requests of the plurality of requests into clusters of the plurality of clusters in time based on a periodic time of occurrence of individual requests of the plurality of requests.

A change in at least one dimension of the first and second groups of requests may be tracked, to generate tracking data, at operation 706. In some aspects, tracking the occurrence of the first and second groups may include generating tracking data that includes a record of time of occurrence, number of occurrences, time window of occurrence, a volume of requests of respective groups, and/or other dimension or dimensions associated with the requests.

In some aspects, operations 702, 704, and 706 may be an example of obtaining tracking data for a plurality of clusters of requests that indicates how the clusters or groups change over at least one dimension. Based on the tracking data which may be generated, or may be obtained from an outside service, one or more predictions indicating total request volume or system load in the future may be generated, at operation 708. In some cases, operation 708 may include projecting clusters of the plurality of clusters into different points in time in the future based on a time interval of occurrence associated with individual clusters of the plurality of clusters, wherein the predictions comprise a total request volume of at least two clusters overlapping at least one of the different points in time.

Using the one or more predictions, it may be determined if groups of requests may overlap at a future time, at operation 710. In some cases, the determination at operation 710 may include determining a total volume of requests at a future time when the at least two groups overlap and comparing that to a request volume threshold or a system threshold. If the threshold is exceed, then process 700 may continue to operation 712 where, optionally, one or more notifications of the predicted system overload condition may be generated. The notification may include the time at which the overlap exceeding the threshold may occur, a total volume of requests predicted to occur at that time, and/or a confidence level associated with the prediction.

In some cases, optionally, one or more resources may be provisioned to handle the total volume of requests predicted to occur, at operation 714. In some aspects, operation 714 may include more generally causing a change in the at least one resource or another resource provisioned to handle the request load in accordance with the prediction. In some cases, the performance of operation 714 may include utilizing an autoscaling service to determine the number or timing of provisioning the additional resources to handle the predicted volume.

If, at operation, 710, either no overlap is predicted to occur, or the total volume of requests is below a threshold, then process 700 may return to operation 702 and continue to loop through operations 702-710 until an overlap and/or system overload condition is predicted to occur.

In some cases, operation 710 may include generating a confidence level associated with the prediction, such that causing the change in the at least one resource provisioned to handle the request load in accordance with the prediction is based on whether the confidence level exceeds a threshold, at operation 714. In some cases, operation 708 may include extrapolating at least one dimension of the different groups or clusters into the future based on the tracking data to determine whether the clusters will at least partially overlap at the future time.

Figure 8:
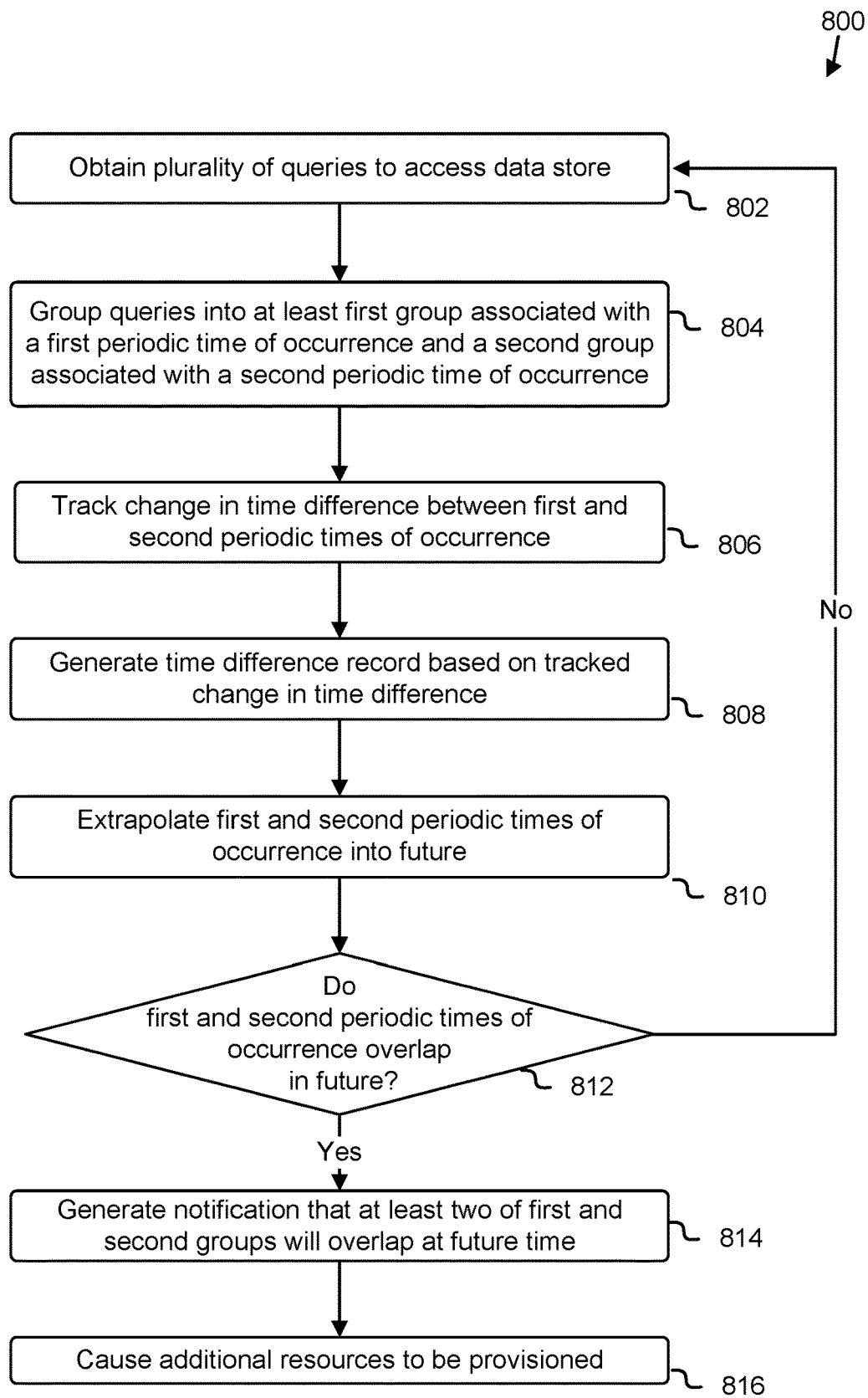
FIG. 8 illustrates an example process for predicting whether resource requests will overlap in time.

FIG. 8 illustrates an example process 800 for predicting whether resource requests to access a data store will overlap in time. FIG. 8 illustrates an example process 800 for pausing a running a task and resuming the task, for example, to conserver compute resources. In some examples, process 800 may be performed by one or more of computing resource service provider 224, data storage service 214, and/or performance monitor 218, 314 and/or database engine 304 described above in reference to FIGS. 2 and 3.

Process 800 may begin at operation 802, in which a plurality of queries to access a data store, such as persistent data storage 216 or more generally data stored by data storage service 214, may be obtained. In some aspects, the actual queries may be intercepted or observed, or copies may be obtained.

At operation 804, the plurality of queries may be grouped into at least a first group and a second group, where the first group is associated with a first periodic time of occurrence and the second group is associated with a second periodic time of occurrence different from the first time of occurrence. In some examples, at least one of the first periodic time of occurrence or the second periodic time of occurrence may change over time. In some aspects, operation 804 may include removing information from the plurality of queries to generate a genericized plurality of queries. Individual queries of the genericized plurality of queries may then be combined to form the first group and the second group. In other examples, operation 804 may include clustering the plurality of queries into the first group and the second group based on a common periodic time window of occurrence by one of k-means clustering or naïve Bayes clustering, or other known clustering technique.

At operation 806, a change in a time difference between the first periodic time of occurrence and the second periodic time of occurrence over may be tracked over multiple periods. At operation 808, a time difference record may be generated based on the tracking, such as described above in reference to FIG. 5. In some aspects, the tracking data, and more specifically, the time difference record may be deleted after a certain, configurable time period has passed, for example. In some cases, this may be done periodically to ensure that the data being relied upon for generating predictions is accurate, to remove outliers, etc. In other cases, the tracking data may be monitored and audited to ensure consistency of data and/or to remove outliers, to increase the accuracy of the predictions.

At operation 810, the first periodic time of occurrence and the second periodic time of occurrence may be extrapolated into the future based on the tracked change in the time difference. The extrapolation may then be used, at operation 812, to determine whether the first periodic time of occurrence and the second periodic time of occurrence will at least partially overlap at a future time.

If the groups are determined to overlap in the future, a notification that the first periodic time of occurrence and the second periodic time of occurrence will at least partially overlap at the future time may be generated at 814, where the notification indicates the future time and a confidence level associated with the first periodic time of occurrence and the second periodic time of occurrence at least partially overlapping at the future time. In some cases, a combined volume of queries at the future time when the groups are predicted to overlap may be determined. In this example, generating the notification that the first periodic time of occurrence and the second periodic time of occurrence will at least partially overlap at the future time, at operation 814, is based on whether the combined volume of queries exceeds a request volume threshold. Based on the generated notification, at operation 816, process 800 may cause the data store to provision additional resources to address the predicted overlap in request groups. In some cases, operation 816 may also be performed at least in part based on whether the combined request volume at the future time exceeds a request volume threshold.

If the groups are determined to not overlap in the future, at operation 812, process 800 may loop back to operations 802-812 until an overlap condition is predicted. In some cases, this may include new queries being obtained for one or more periods in the future, and then regrouping the queries into groups, tracking changes in the groups, generating a new or updated time difference record, and extrapolating the groups into the future.

In some aspects, the tracking data may be used to generate a notification of groups changing order in time, such as when a first group may catch up with and overtake a second group in time, without overlapping or overlapping to exceed a threshold that would indicate a system overload condition. This may be useful to a user or customer of a computing resource service provider, for example, to note changes in request frequency and time.

Figure 9:
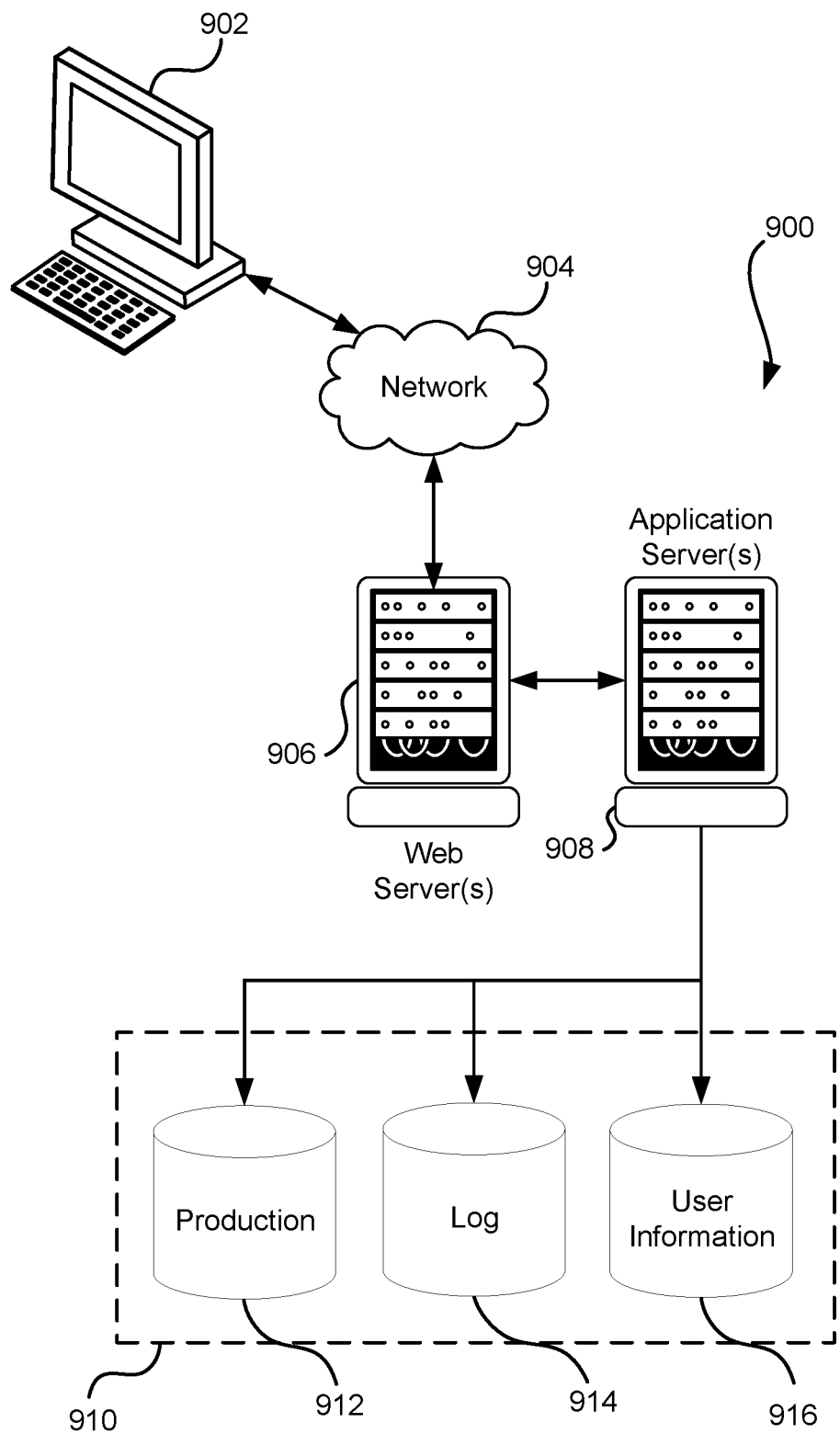
FIG. 9 illustrates an environment in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP:

Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:
1. A system, comprising:
one or more processors; and
memory that stores computer-executable instructions that are executable by the one or more processors to cause the system to:
obtain a plurality of queries to access a data store;
group the plurality of queries into at least a first group and a second group, wherein the first group is associated with a first periodic time of occurrence and the second group is associated with a second periodic time of occurrence different from the first time of occurrence, wherein at least one of the first periodic time of occurrence or the second periodic time of occurrence changes over time;
track a change in a time difference between the first periodic time of occurrence and the second periodic time of occurrence over multiple periods to generate a time difference record;
extrapolate the first periodic time of occurrence and the second periodic time of occurrence into the future based on the tracked change in the time difference to determine whether the first periodic time of occurrence and the second periodic time of occurrence will at least partially overlap at a future time;
generate a notification that the first periodic time of occurrence and the second periodic time of occurrence will at least partially overlap at the future time, wherein the notification indicates the future time and a confidence level associated with the first periodic time of occurrence and the second periodic time of occurrence at least partially overlapping at the future time; and based on the generated notification, cause the data store to provision additional resources.

2. The system of claim 1, wherein instructions that cause the system to group the plurality of queries into at least the first group and the second group further comprise instructions that, when executed by the one or more processors, further cause the system to:
  remove information from the plurality of queries to generate a genericized plurality of queries; and
  combine individual queries of the genericized plurality of queries to form the first group and the second group.

3. The system of claim 1, wherein instructions that cause the system to group the plurality of queries into at least the first group and the second group further comprise instructions, when executed by the one or more processors, further cause the system to:
  cluster the plurality of queries into the first group and the second group based on a common periodic time window of occurrence by one of k-means clustering or naïve Bayes clustering.

4. The system of claim 1, wherein the instructions, when executed by the one or more processors, further cause the system to:
  determine a combined volume of queries at the future time; and wherein generating the notification that the first periodic time of occurrence and the second periodic time of occurrence will at least partially overlap at the future time is based on whether the combined volume of queries exceeds a threshold.

5. A computer-implemented method comprising:
  obtaining tracking data for a plurality of clusters of requests to access a system provisioned with at least one resource, the tracking data indicating how the plurality of clusters change over at least one dimension;
  calculating, based on the tracking data, a prediction indicating a request load on the system at a future time; and
  causing a change in the at least one resource or another resource provisioned to handle the request load in accordance with the prediction.

6. The computer-implemented method of claim 5, wherein the at least one dimension comprises a time of occurrence of the plurality of clusters.

7. The computer-implemented method of claim 6, further comprising grouping requests of the plurality of clusters of requests into the plurality of clusters based on a time interval of occurrence associated with the requests.

8. The computer-implemented method of claim 5, further comprising grouping requests of the plurality of clusters of requests into the plurality of clusters based on the at least one dimension.

9. The computer-implemented method of claim 5, wherein causing the change in the at least one resource provisioned to handle the request load in accordance with the prediction is based on whether the request load exceeds a request volume threshold.

10. The computer-implemented method of claim 5, further comprising generating a confidence level associated with the prediction, and wherein causing the change in the at least one resource provisioned to handle the request load in accordance with the prediction is based on whether the confidence level exceeds a threshold.

11. The computer-implemented method of claim 5, wherein the at least one resource comprises at least one data storage device or cache used to process the plurality of clusters of requests.

12. The computer-implemented method of claim 5, wherein calculating the prediction indicating the request load on the system at the future time further comprises:
  tracking a change in the at least one dimension between requests of different clusters of the plurality of clusters; and
  extrapolating the at least one dimension of the different clusters into the future based on the tracking data to determine whether the clusters will at least partially overlap at the future time.

13. A non-transitory computer-readable storage medium storing thereon executable instructions that, as a result of being executed by one or more processors of a computer system, cause the computer system to at least:
  group a plurality of requests to access a system into a plurality of clusters;
  track how the plurality of clusters change over time to generate tracking data;
  generate, based on the tracking data, predictions of load on the system; and
  cause resources associated with the system to be provisioned in accordance with the predictions.

14. The non-transitory computer-readable storage medium of claim 13, wherein the executable instructions that cause the computer system to group the requests to access the system into the plurality of clusters further comprise executable instructions that, when executed by the one or more processors, further cause the computer system to:
  determine a time interval of occurrence of individual requests of the plurality of requests; and
  group requests of the plurality of requests into a cluster of the plurality of clusters based on the time interval of occurrence.

15. The non-transitory computer-readable storage medium of claim 13, wherein the executable instructions that cause the computer system to track how the plurality of clusters change over time to generate the tracking data further comprise executable instructions that, when executed by the one or more processors, further cause the computer system to:
  track at least one of a change in volume of requests over time or a change in time interval of occurrence over time to generate the tracking data.

16. The non-transitory computer-readable storage medium of claim 13, wherein requests of a first cluster of the plurality of clusters are associated with a first periodic time of occurrence, and requests of a second cluster of the plurality of clusters are associated with a second periodic time of occurrence, wherein the first periodic time of occurrence is different than the second periodic time of occurrence.

17. The non-transitory computer-readable storage medium of claim 13, wherein the executable instructions that cause the computer system to generate, based on the tracking data, the predictions of load on the system further comprise executable instructions that, when executed by the one or more processors, further cause the computer system to:
  project clusters of the plurality of clusters into different points in time in the future based on a time interval of occurrence associated with individual clusters of the plurality of clusters, wherein the predictions comprise a total request volume of at least two clusters overlapping at least one of the different points in time.

18. The non-transitory computer-readable storage medium of claim 17, wherein the executable instructions that cause the computer system to cause the resources associated with the system to be provisioned in accordance with the predictions further comprise executable instructions that, when executed by the one or more processors, further cause the computer system to:

determine whether the total request volume of the at least one cluster at individual points of time of the different points in time exceed a request volume threshold to cause the resources associated with the system to be provisioned.

19. The non-transitory computer-readable storage medium of claim 13, wherein the executable instructions that cause the computer system to group the requests to access the system into the plurality of clusters further comprise executable instructions that, when executed by the one or more processors, further cause the computer system to:

partition requests of the plurality of requests into clusters of the plurality of clusters in time based on a periodic time of occurrence of individual requests of the plurality of requests.

20. The non-transitory computer-readable storage medium of claim 13, wherein the system is a computing resource service provider, and wherein the resources comprise at least one data storage device or cache used to process the requests.

\* \* \* \* \*